(12) United States Patent
Cherukumudi et al.

(10) Patent No.: US 8,560,851 B1
(45) Date of Patent: Oct. 15, 2013

(54) MANAGING DIGITAL CERTIFICATES (75) Inventors: Vijaykumar Cherukumudi, Overland Park, KS (US); Lesley Cranor, Overland Park, KS (US); David K. Fultz, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1184 days.

(21) Appl. No.: 12/467,253

(22) Filed: May 15, 2009

(51) Int. Cl.
H04L 9/32 (2006.01)
H04L 29/06 (2006.01)
G06F 7/04 (2006.01)

(52) U.S. Cl.
USPC ........... 713/169; 713/155; 713/156; 713/168; 726/2; 726/5; 726/10

(58) Field of Classification Search
USPC ............ 726/2, 3, 5, 6, 10; 713/150, 155–159, 713/168–171, 175; 380/227–229
See application file for complete search history.

(56) References Cited

U.S. PATENT DOCUMENTS

| | | | |
|---|---|---|---|
| 6,233,577 B1 * | 5/2001 | Ramasubramani et al. | 1/1 |
| 7,130,999 B2 * | 10/2006 | Yasala et al. | 713/157 |
| 7,461,250 B1 * | 12/2008 | Duane et al. | 713/157 |
| 7,823,190 B1 * | 10/2010 | Kacarov et al. | 726/6 |
| 8,116,456 B2 * | 2/2012 | Thomas | 380/277 |
| 2003/0188156 A1 * | 10/2003 | Yasala et al. | 713/156 |
| 2004/0059686 A1 * | 3/2004 | Levesque | 705/71 |
| 2004/0171369 A1 * | 9/2004 | Little et al. | 455/410 |
| 2004/0255037 A1 * | 12/2004 | Corvari et al. | 709/229 |
| 2005/0021964 A1 * | 1/2005 | Bhatnagar et al. | 713/175 |
| 2005/0074124 A1 * | 4/2005 | Thornton et al. | 380/277 |
| 2006/0047950 A1 * | 3/2006 | Thayer | 713/156 |
| 2010/0077208 A1 * | 3/2010 | Appiah et al. | 713/158 |

OTHER PUBLICATIONS

"Public key certificate", Wikipedia, http://en.wikipedia.org/w/index.php?title=Public_key_certificate&printable=yes, Jun. 2, 2008, pp. 1-3, Wikipedia.org.

"Digital certificate", SearchSecurity.com Definitions, http://searchsecurity.techtarget.com/sDefinition/0,,sid14_gci211947,00.html, Jun. 2, 2008, Whatis.com.

* cited by examiner

Primary Examiner — Tae Kim (57) ABSTRACT

A system is provided for managing digital certificates. The system includes a host system, which includes a user interface, a plurality of disparate host certificate stores, and a management tool. The plurality of disparate host certificate stores includes a plurality of host server certificates. The management tool retrieves a copy of one of the plurality of host server certificates from any of the plurality of disparate host certificate stores, provides the copy of the one of the plurality of host server certificates to a partner system for loading in a partner certificate store, communicates with the partner system to validate the one of the plurality of host server certificates, and outputs a host server certificate message to the user interface.

14 Claims, 5 Drawing Sheets

MANAGING DIGITAL CERTIFICATES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A digital certificate is electronic information associated with a user computer and with the communications and the signals from the user computer, whereby the digital certificate establishes the credentials of a computer and/or the user of the computer who communicates or sends a signal from the user computer. Digital certificates rely on trusted certification authorities which receive requests for and issue digital certificates. Certification authorities are trusted because they are bound by legal agreements to create only valid and reliable digital certificates. An X.509 digital certificate includes a version identifier which identifies which version of the X.509 digital certificate standard was employed in creating the digital certificate, and a serial number uniquely identifying the digital certificate within the issuing certification authority. Such a digital certificate also includes a signature algorithm identifier identifying the signature algorithm used by the certification authority to sign the digital certificate, an issuer name identifying the certification authority which signed the digital certificate, and a validity period defining for what time period the digital certificate is valid. The digital certificate also includes a subject name of the entity whose public key is contained in the certificate, a subject public key information identifying the encryption algorithm and the public key of the entity to which the digital certificate is issued, and the digital signature of the issuing certification authority. The digital signature of the issuing certification authority is calculated over the rest of the digital certificate using the public key of the certification authority. The digital certificate is created by the issuing certification authority when a qualified requestor requests the digital certificate and provides the necessary information. The certification authority may retain a list of digital certificates, termed a certificate revocation list, which it earlier issued but has since revoked.

SUMMARY

In some embodiments, a system is provided for managing digital certificates. A host system includes a user interface, disparate host certificate stores, and a management tool. The disparate host certificate stores include host server certificates. The management tool retrieves a copy of one of the host server certificates from any of the disparate host certificate stores, provides the copy of the one of the host server certificates to a partner system for loading in a partner certificate store, communicates with the partner system to validate the one of the host server certificates, and outputs a host server certificate message to the user interface based on the communication.

In some embodiments, a computer implemented method is provided for managing digital certificates. A copy of one of multiple host server certificates is retrieved from any of multiple disparate host certificate stores. The copy of the one of the multiple host server certificates is provided to a partner system for loading in a partner certificate store. The one of the multiple host server certificates is validated by communicating with the partner system. A host server certificate message is output to a user interface based on the communication.

In some embodiments, a method is provided for managing digital certificates. A connection error is received. A test message is sent to test a connection associated with the connection error. Details of a communication handshake are provided to a user interface based on the test message. In response to a selection via the user interface, information associated with a partner server certificate is requested from a partner system. The information is analyzed to ensure that the partner server certificate is unexpired and uncorrupted. The information is analyzed to ensure that a host certificate store trusts a certification authority associated with the partner server certificate. A partner server certificate message is output to the user interface based on analyzing the information and the certification authority for the host certificate store.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A digital certificate mandated computer is a secure computer that requires signals or communication from other initiating systems to be associated with a valid digital certificate as a prerequisite to communication. For example, if a digital certificate mandated server system receives a communication associated with a valid digital certificate from a client system, the server system communicates and responds accordingly.

If, however, the communication does not include a valid digital certificate, the digital certificate mandated server system may not respond or may respond in a manner that is unfamiliar to the initiating client system, causing a communication failure. A user of such initiating client system may be unaware that the reason for the communication failure is that the initiating client system does not have a valid digital certificate.

In some situations, both the client system and the server system may require signals or communication from each other to be associated with a valid digital certificate as a prerequisite to communication. A communication failure may result if the communication or signal from either system does not include a valid digital certificate. A user of either system may be unaware that the reason for the communication failure is that either the client system or the server system does not have a valid digital certificate. For example, a user of the client system may perceive the communication failure to be attributed to the client system lacking a valid client certificate when the communication failure is actually caused by the client system not validating the server certificate from the server system.

Communication between a client system and a server system may fail if the client system has an expired or corrupted digital certificate, if the server system cannot validate the client system digital certificate, if the server system has an expired or corrupted digital certificate, and/or if the client system cannot validate the server system digital certificate. Embodiments of the present disclosure provide a management tool that manages digital certificates by verifying that any required certificates are unexpired and uncorrupted, testing communications between client systems and server systems to verify that each system can validate the other system's digital certificates, and outputting the verifications to a user interface. If one of the systems does not respond to a test communication, the management tool may simulate communication from the system using a copy of the system's certificate to validate the system's certificate. In response to the simulated communication from the system, the management tool may attempt to validate the system's certificate and output a certificate message to a user interface based on the simulated communication. The management tool may test communications between client systems and server systems reactively in response to receipt of connection errors to troubleshoot such errors. In an embodiment, the management tool may proactively test communications prior to the receipt of any connection errors to identify and correct digital certificate related failures, before they occur during normal operations or during demonstration of a technology to a customer.

The following example illustrates embodiments of the present disclosure related to telecommunications providers, however the present system is not so limited and may be applied to any systems, as will be readily apparent to one skilled in the art. More specifically, but not by way of limitation, some applications may be secured on digital certificate mandated host systems with corresponding applications secured on partner systems, which may be digital certificate mandated partner systems. The host and partner systems execute host and partner applications that collaborate at least partly through the exchange of digital certificates. These applications may be software and/or graphical user interfaces that enable or promote establishing, for example, wireless telecommunications service for new customers. A vendor or reseller of wireless or other telecommunications service may require access to a telecommunications provider's information technology (IT) host systems and applications to establish, for example, new customer accounts, and/or address other customer service issues. Where the telecommunications provider's applications are maintained on digital certificate mandated host systems, the vendor's partner systems require client digital certificates in order to initiate access of the applications. The telecommunications provider may receive communications from numerous vendors, which may require the telecommunications provider's host systems to validate a different client certificate for each of the vendors' partner systems.

If the vendor's partner systems are digital certificate mandated partner systems, the telecommunications provider's host systems may require a different server certificate to communicate responses to each of the vendor's partner systems. Furthermore, if the telecommunications provider's host systems also initiate communication with the vendors' partner systems, then the telecommunications provider's host systems may need to use a different client certificate to initiate communication with each vendor's partner system, and each vendor's partner system may need to use a different server certificate to respond to communications initiated by the telecommunications provider's host systems. Each of the telecommunications provider's host systems may need to maintain a different host server certificate, a different host client certificate, a different partner server certificate, and a different partner client certificate for each of the vendor's partner systems.

Maintaining four different digital certificates for each vendor may prove to be a challenge for each of the telecommunications provider's host systems because each digital certificate may have a different expiration date, each digital certificate needs to be checked against a corresponding certificate revocation list from any of a number of certification authorities, and each vendor may use a different certification authority to provide its digital certificates. Although each certification authority may enable or provide a service that notifies system administrators when its own digital certificate is nearing its expiration date, some notifications may subsequently be sent to former system administrators due to the many years that transpired between the time a digital certificate is initially provided and the time a digital certificate nears its expiration date. Due to the large number of digital certificates maintained in a host system over many years, expirations of digital certificates may be responsible for a number of communication failures.

Therefore, if a digital certificate mandated host rejects a communication attempt without providing any information about the reasons for the failure, system administrators for both the telecommunication service provider and the vendors may not be able to determine which, if any, of the digital certificates was responsible for the communication failure. Such a scenario may be unsatisfactory for the telecommunications provider, because the vendor might be unable to assist a customer with a problem or the vendor might become frustrated and instead sell the customer products and services of another telecommunications provider.

Embodiments of systems and methods are provided for managing digital certificates. A management tool retrieves a copy of a host server certificate from any of multiple host certificate stores, even if each host certificate store is associated with a different partner and each partner's digital certificates were generated by a different certification authority. The management tool provides the copy of the host server certificate to a corresponding partner system for loading in the partner's certificate store. The management tool generates and sends a test message to the partner system using the host server certificate to validate the host server certificate. The management tool outputs a host server certificate message to the user interface based on the partner system's response to the test message that used the host server certificate. The management tool may provide and test validation of each host server certificate to evaluate a test system prior to the test of an application, to evaluate a production system on a periodic basis, or to evaluate a production system in response to a request to identify a source of a problem. The management tool may also test validation of each partner client certificate, each host client certificate, and each partner server certificate and output corresponding validation messages.

When notice of a connection error is received, the management tool may send a test message to test a connection associated with the connection error and provide details of a communication handshake to a user interface based on the test message. In response to a selection via the user interface, the management tool may request information associated with a digital certificate, such as a partner server certificate from a partner system. The management tool may analyze the information to ensure that the digital certificate is unexpired and uncorrupted, and that a corresponding certificate store trusts a certification authority associated with the digital certificate. The management tool outputs a digital certificate message to the user interface based on analyzing the digital certificate information, which may be based on a host server certificate, a host client certificate, a partner client certificate, or a partner server certificate. Therefore, the management tool, which may execute in test systems or periodically in production systems, may detect the problems, such as expiration of digital certificates, which are responsible for communication failures. The management tool may identify an expiration date for a digital certificate and output an expiration notice to a user interface prior to the expiration of the digital certificate. The management tool may detect some problems with digital certificates that cause communication failures when the problems occur or before the problems occur, thereby enabling better communication with partner systems.

Figure 1:
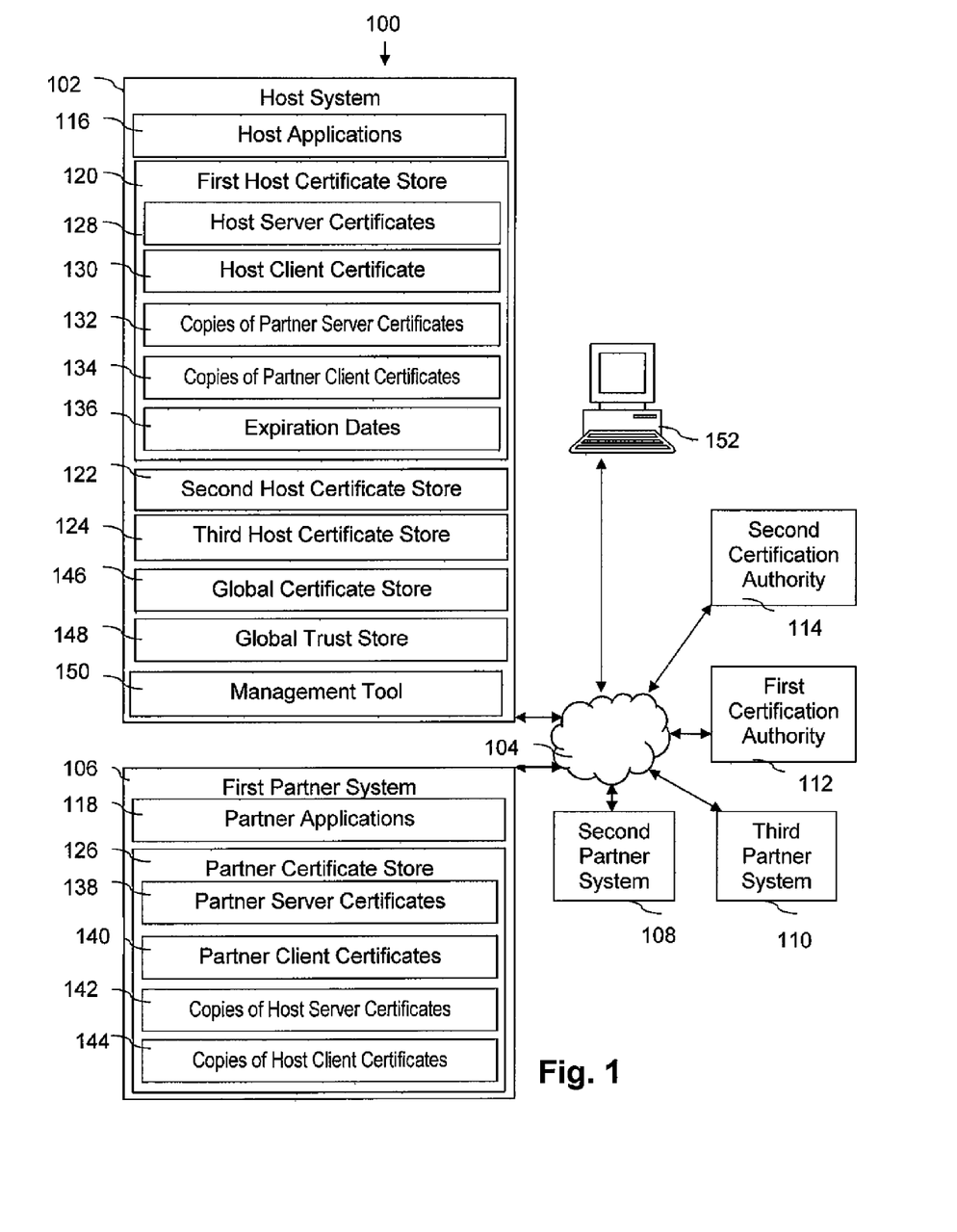
FIG. 1 shows a block diagram of a system for managing digital certificates according to some embodiments of the present disclosure.

Turning now to FIG. 1, a block diagram of a system 100 for managing digital certificates is shown according to some embodiments of the present disclosure. The system 100 includes a host system 102, a network 104, a first partner system 106, a second partner system 108, a third partner system 110, a first certification authority 112, and a second certification authority 114. The host system 102, the first partner system 106, the second partner system 108, the third partner system 110, the first certification authority 112, and the second certification authority 114 communicate via the network 104. The first certification authority 112 and the second certification authority 114 may provide digital certificates for the first partner system 106, the second partner system 108, and the third partner system 110.

The host system 102 executes host applications 116, and the first partner system 106 executes partner applications 118. The host system 102 maintains a first host certificate store 120, a second host certificate store 122, and a third host certificate store 124 to communicate with the first partner system 106, the second partner system 108, and the third partner system 110, respectively. The first partner system 106 maintains a partner certificate store 126 to communicate with the host system 102. The host system 102 and the first partner system 106 execute the host applications 116 and the partner applications 118 that collaborate at least partly through the exchange of the digital certificates that are stored in the first host certificate store 120 and the partner certificate store 126.

The first host certificate store 120 may maintain host server certificates 128, host client certificates 130, copies of partner server certificates 132, copies of partner client certificates 134, and expiration dates 136 for at least some of the certificates 128-134. The partner certificate store 126 may maintain partner server certificates 138, partner client certificates 140, copies of host server certificates 142, and copies of host client certificates 144.

The host system 102 may also include a global certificate store 146, a global trust store 148, and a management tool 150 that communicates with a user interface 152 via the network 104. The management tool 150 may retrieve a copy of a host server certificate, such as one of the host server certificates 128, from any of multiple host certificate stores 120-124. The management tool 150 provides the copy of the host server certificate to the first partner system 106 for loading in the partner certificate store 126 as one of the copies of host server certificates 142. The management tool 150 generates and sends a test message via the network 104 to the first partner system 106 using the host server certificate to validate the host server certificate. Since the management tool 150 has provided the host server certificate to the first partner system 106, the first partner system 106 should be able to validate the test message sent by the management tool 150 using the same host server certificate. Such a validation test may be able to detect problems in advance. The management tool 150 outputs a host server certificate message to the user interface 152 based on the response of the first partner system 106 to the test message that used the host server certificate. The management tool 150 may provide and test validation of the host server certificate to evaluate a test system prior to a test of an application on the test system, to evaluate a production system on a periodic basis, or to evaluate a production system in response to a request to identify a source of a problem. For example, each day the management tool 150 tests the host server certificate that the host system 102 uses to respond to communications initiated by the first partner system 106.

If the host system 102 also mandates digital certificates, the management tool 150 may prompt the first partner system 106 for a certificate signing request and forward the certificate signing request to the second certification authority 114, which creates digital certificates for the host system 102. The management tool 150 may receive a partner client certificate from the second certification authority 114, and provide a copy of the partner client certificate to any of the host certificate stores 120-124. For example, the management tool 150 loads the partner client certificate as one of the copies of partner client certificates 134 in the first host certificate store 120. The management tool 150 may also forward the partner client certificate to the first partner system 106 for loading in the partner certificate store 126 as one of the partner client certificates 140.

The management tool 150 may use a test message to request communication from the first partner system 106 to the management tool 150 using the copy of the partner client certificate. If the first partner system 106 does not respond with the requested communication, the management tool 150 may use a test message to simulate communication from the first partner system 106 using the copy of the partner client certificate to validate the partner client certificate. In response to the requested communication or the simulated communication from the first partner system 106, the management tool 150 attempts to validate the partner client certificate and outputs a partner client certificate message to the user interface 152 based on the requested or simulated communication. Since the management tool 150 has provided the partner client certificate to the first partner system 106, the management tool 150 should be able to validate the requested communication or the simulated communication sent by the first partner system 106 using the same partner client certificate. Such a validation test may be able to detect problems prior to test systems or production systems experiencing a related communication failure.

If the host system 102 also initiates communication with the first partner system 106, the management tool 150 may retrieve a copy of one of the partner server certificates 138 from the first partner system 106 and load the copy of the partner server certificate to any of the host certificate stores 120-124. For example, the management tool 150 loads one of the copies of partner server certificates 132 in the first host certificate store 120. The management tool 150 may generate and send a test message to the first partner system 106 to validate the copy of the partner server certificate loaded as one of the copies of partner server certificates 132. Since the management tool 150 has retrieved the partner server certificate for the host system 102 from the first partner system 106, the host system 102 should be able to validate the response to the test message sent by the management tool 150 to the first partner system 106 using the same host server certificate. Such a validation test may be able to detect problems prior to test systems or production systems experiencing a related communication failure. The management tool 150 outputs a partner server certificate message to the user interface 152 based on the response of the first partner system 106 to the test message that used the partner server certificate.

If the host system 102 also initiates communication with the first partner system 106, the management tool 150 may generate a certificate signing request and forward the certificate signing request to the first partner system 106. In response to the certificate signing request, the management tool 150 may receive a host client certificate from the first partner system 106, which may have been generated by the first certification authority 112, which generates certificates for the first partner system 106. The management tool 150 verifies that the host client certificate received from the first partner system 106 is valid (not corrupt) and provides a copy of the host client certificate to a corresponding one of the host certificate stores 120-124. The management tool 150 translates the host client certificate for use by the host applications 116 and uploads the host client certificate to the host applications 116 in a proper format. The management tool 150 communicates with the first partner system 106 to validate the host client certificate, and outputs a host client certificate message to the user interface 152 based on the communication. Since the management tool 150 has received the host client certificate for the host system 102 from the first partner system 106, the host system 102 should be able to validate the test message sent by the management tool 150 to the first partner system 106 using the same host client certificate. Such a validation test may be able to detect problems in advance.

The management tool 150 may also ensure that each of the host certificate stores 120-124 exists, open each of the host certificate stores 120-124, ensure each certificate store password is valid, ensure each of the host certificate stores 120-124 is properly formatted, and report any expired entries to the user interface 152. The management tool 150 may also identify an expiration date for a digital certificate and output an expiration notice to the user interface 152 prior to the expiration of the digital certificate. In response to a selection via the user interface 152, the management tool 150 may create a new certificate store based on the one of the host certificate stores 120-124 that the management tool 150 has identified as expiring soon. The management tool 150 may create the new certificate store by copying a subject name, an encryption algorithm, an email attribute, and/or a distribution list from the one of the host certificate stores 120-124 to the new certificate store.

Further to the creation of the new certificate store, the management tool 150 generates a certificate signing request and forwards the certificate signing request to the corresponding certification authority 112-114. In response to forwarding the certificate signing request, the management tool 150 receives a new certificate that corresponds to the soon-to-be expired certificate from the corresponding certification authority 112-114, loads the new certificate in the new certificate store, and provides the new certificate to the first partner system 106. The first partner system 106 may continue to use the soon-to-be expired certificate for some time, but once the management tool 150 receives a notification that indicates the first partner system 106 has installed the new certificate, the management tool 150 overwrites the new certificate store on the one of the host certificate stores 120-124 that is about to expire. Therefore, the management tool 150 may identify an expiration date for a certificate before the certificate expires and creates communication failures, and use information about the soon-to-expire certificate as a template to create a new certificate store, such that communications that use the soon-to-expire certification seamlessly transition to using the new certificate. Similarly, the management tool 150 may also create a new certificate store for a new partner.

When notice of a connection error is received, the management tool 150 may send a test message to test a connection associated with the connection error and provide details of a communication handshake to the user interface 152 based on the test message. In response to the details of a communication handshake provided to the user interface 152, a user of the system may select from a number of options to analyze information associated with a host server certificate, a host client certificate, a partner client certificate, and/or a partner server certificate that may have been involved in the connection error.

In response to one option selected via the user interface 152, the management tool 150 requests information associated with one of the partner server certificates 138 from the first partner system 106. The management tool 150 analyzes the information to ensure that the partner server certificate is unexpired and uncorrupted, and that the first host certificate store 120 trusts the first certification authority 112 that generated the partner server certificate. The management tool 150 may analyze information by comparing the partner server certificate to a certificate revocation list. The management tool 150 outputs a partner server certificate message to the user interface 152 based on analysis of the partner server certificate information.

In response to another option selected via the user interface 152, the management tool 150 provides information associated with a host client certificate from the first host certificate store 120. The management tool 150 analyzes the information associated with the host client certificate to ensure that the host client certificate is unexpired and uncorrupted, to ensure that a private key in the host client certificate is uncorrupted, and to ensure that the partner certificate store 126 trusts the first certification authority 112 associated with the host client certificate. The management tool 150 may analyze information by comparing the host client certificate to a certificate revocation list. The management tool 150 outputs a host client certificate message to the user interface 152 based on analysis of the host client certificate information.

In response to yet another option selected via the user interface 152, the management tool 150 verifies that the partner certificate store 126 has a copy of a partner client certificate, that the partner client certificate is unexpired and uncorrupted, and that the first host certificate store 120 trusts the first certification authority 112 associated with the partner client certificate. The management tool 150 may analyze information by comparing the partner client certificate to a certificate revocation list. The management tool 150 outputs a partner client certificate message to the user interface 152 based on verifications associated with the partner client certificate.

In response to an additional option selected via the user interface 152, the management tool 150 verifies that the partner certificate store 126 trusts the first certification authority 112 associated with a host server certificate, and that the first host certificate store 120 has the host server certificate. The management tool 150 simulates communication from the first partner system 106 to capture information about the host server certificate, and analyzes the information about the host server certificate to ensure that the host server certificate is unexpired and uncorrupted. The management tool 150 may analyze information by comparing the host server certificate to a certificate revocation list. The management tool 150 outputs a host server certificate message to the user interface 152 based on analysis of the information and verifications associated with the host server certificate. Therefore, no matter what type of digital certificate may be involved in a connection error, the management tool 150 may analyze information associated with the digital certificate and output this information to assist in eliminating the connection error.

The global certificate store information 146 is accessed by the management tool 150 to validate the host system's global keystore. The management tool 150 uses the global certificate store information 146 to validate global public key/private key pairs used for client identity during the host system's secure sockets layer communications.

The global trust store information 148 is accessed by the management tool 150 to validate the host system's global trust store. The management tool 150 uses the global trust store information 148 to validate the host system's trusted certificates entries used for server certificate trust validation during the host system's secure sockets layer communications.

The management tool 150, which may execute in test systems or periodically in production systems, may detect problems, such as the expiration of digital certificates, which are responsible for communication failures. The management tool 150 may identify an expiration date for a digital certificate and output an expiration notice to the user interface 152 prior to the expiration of the digital certificate. The management tool 150 may detect communication failures due to some problems with digital certificates prior to test systems or production systems experiencing a related communication failure, thereby enabling better communication between the host system 102 and the partner systems 106-110.

Figure 5:
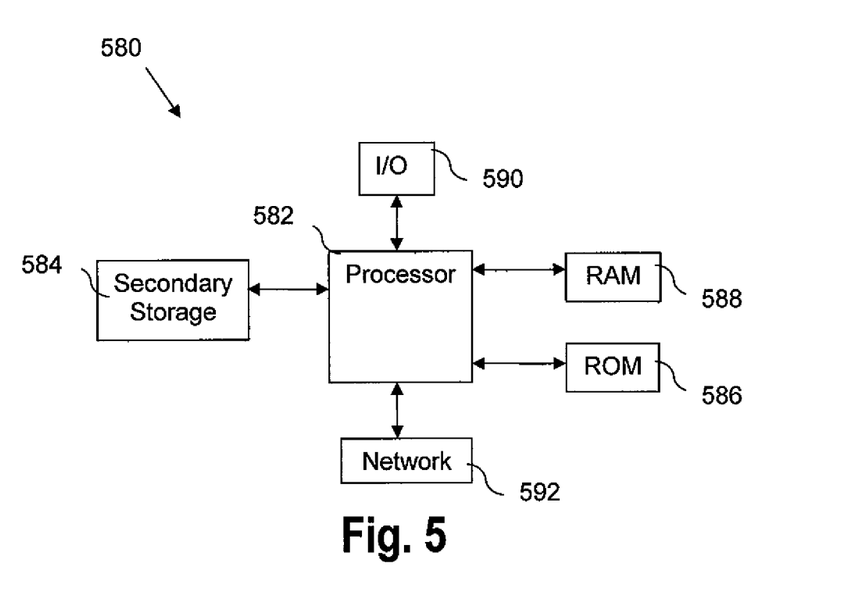
FIG. 5 illustrates an exemplary computer system suitable for implementing the several embodiments of the disclosure.

The management tool 150 may be implemented by a computer, which is described in greater detail in reference to FIG. 5. Although some embodiments describe the management tool 150 as electronically taking certain actions or processing certain data, in other embodiments some of these actions or activities may be accomplished manually. In other embodiments, these actions may be accomplished partially manually and partially by the management tool 150. The management tool 150 may include an application program interface, such as a web portal, that may be accessed via the user interface 152.

Figure 2:
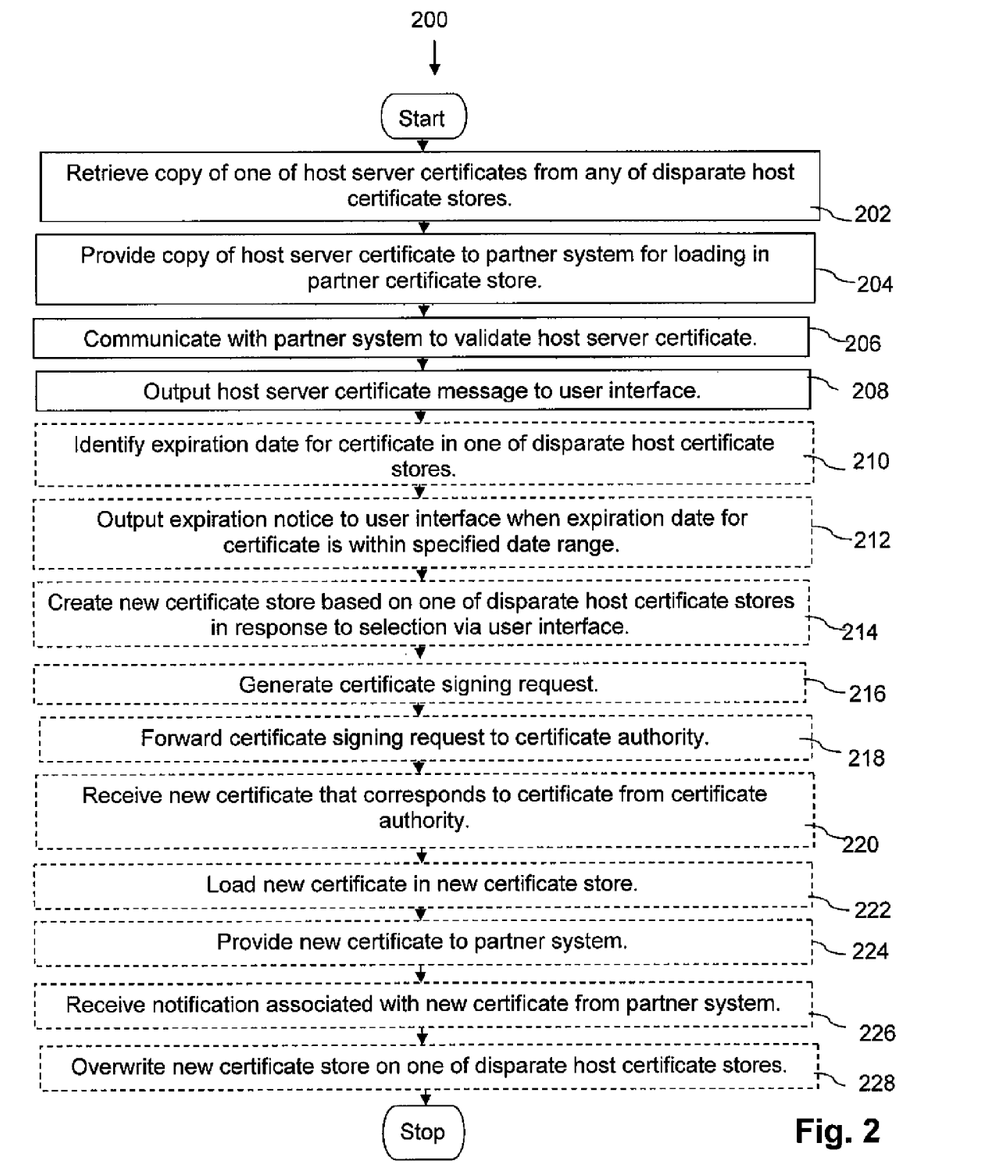
FIG. 2 shows a flowchart of a method for managing digital certificates according to some embodiments of the present disclosure.

FIG. 2 shows a flowchart of a method 200 for managing digital certificates according to some embodiments of the present disclosure. The system 100 can execute the method 200 to validate digital certificates used in communications between host and partner systems.

In box 202, a copy of one of the host server certificates is retrieved from any of the disparate host certificate stores. For example, the management tool 150 retrieves a copy of a host server certificate, such as one of the host server certificates 128, from any of the host certificate stores 120-124.

In box 204, a copy of a host server certificate is provided to a partner system for loading in a partner certificate store. For example, the management tool 150 provides a copy of one of the host server certificates 128 to the first partner system 106 for loading in the partner certificate store 126.

In box 206, communication occurs with a partner system to validate a host server certificate. For example, the management tool 150 communicates with the first partner system 106 to validate one of the host server certificates 128.

In box 208, a host server certificate message is output to a user interface based on the communication. For example, the management tool 150 outputs a host server certificate message to the user interface 152 based on the communication that used the host server certificate.

In box 210, an expiration date is optionally identified for a certificate in one of the disparate host certificate stores. For example, the management tool 150 identifies an expiration date for a certificate in one of the host certificate stores 120-124.

In box 212, an expiration notice is optionally output to a user interface when an expiration date for a certificate is within a specified date range. For example, the management tool 150 outputs an expiration notice to the user interface 152 when the expiration date for a certificate is within two weeks of expiring.

In box 214, in response to a selection via a user interface, a new certificate store is optionally created based on one of the disparate host certificate stores. For example, the management tool 150 creates a new certificate store based on one of the host certificate stores 120-124 that is determined to be expiring soon.

In box 216, a certificate signing request is optionally generated. For example, the management tool 150 generates a certificate signing request based on the soon-to-be expired certificate.

In box 218, a certificate signing request is optionally forwarded to a certification authority. For example, the management tool 150 forwards the certificate signing request to the first certification authority 112.

In box 220, a new certificate that corresponds to the certificate is optionally received from a certification authority. For example, the management tool 150 receives a new certificate that corresponds to the soon-to-be expired certificate from the first certification authority 112.

In box 222, a new certificate is optionally loaded in a new certificate store. For example, the management tool 150 loads the new certificate in the new certificate store.

In box 224, a new certificate is optionally provided to a partner system. For example, the management tool 150 provides the new certificate to the first partner system 106.

In box 226, a notification associated with a new certificate is optionally received from a partner system. For example, the management tool 150 receives a notification that the first partner system 106 installed the new certificate.

In box 228, a new certificate store is optionally overwritten on one of the disparate host certificate stores. For example, the management tool 150 overwrites the new certificate store on the one of the host certificate stores 120-124 that is to expire soon.

Figure 3:
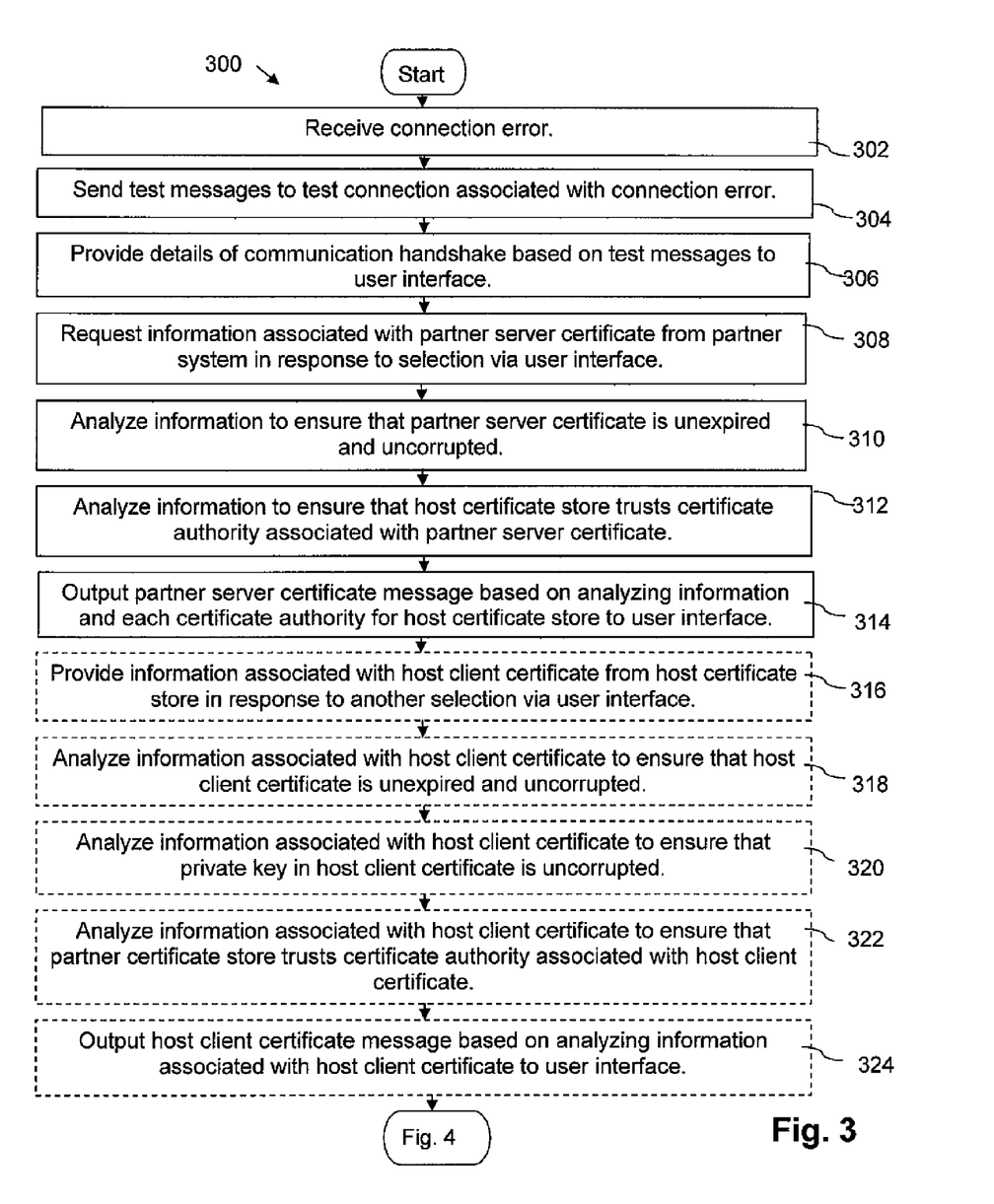
FIG. 3 shows a flowchart of another method for managing digital certificates according to some embodiments of the present disclosure.

FIG. 3 shows a flowchart of a method 300 for managing digital certificates according to some embodiments of the present disclosure. The system 100 can execute the method 300 to output messages based on analysis of information associated with host client certificates and partner server certificates. In box 302, a connection error is received. For example, the management tool 150 receives a connection error.

In box 304, a test message is sent to a test connection associated with the connection error. For example, the management tool 150 sends a test message to the test connection associated with the connection error.

In box 306, details of a communication handshake are provided to a user interface based on a test message. For example, the management tool 150 provides details of the communication handshake to user interface 152 based on the test message.

In box 308, in response to a selection via a user interface, information associated with a partner server certificate is requested from a partner system. For example, the management tool 150 requests information associated with a partner server certificate from the first partner system 106.

In box 310, information is analyzed to ensure that a partner server certificate is unexpired and uncorrupted. For example, the management tool 150 compares a partner server certificate to a certificate revocation list.

In box 312, information is analyzed to ensure that a host certificate store trusts a certification authority associated with a partner server certificate. For example, the management tool 150 ensures that the first host certificate store 120 trusts the first certification authority 112 that generated the partner server certificate.

In box 314, a partner server certificate message is output to a user interface based on analyzing the information and the certification authority for a host certificate store. For example, the management tool 150 outputs a partner server certificate message to the user interface 152 based on analyzing information and the certification authority 112 for the first host certificate store 120.

In box 316, in response to another selection via a user interface, information associated with a host client certificate from a host certificate store is optionally provided. For example, the management tool 150 provides information associated with a host client certificate from the first host certificate store 120.

In box 318, information associated with a host client certificate is optionally analyzed to ensure that a host client certificate is unexpired and uncorrupted. For example, the management tool 150 compares the host client certificate to a certificate revocation list.

In box 320, information associated with a host client certificate is optionally analyzed to ensure that a private key in the host client certificate is uncorrupted. For example, the management tool 150 ensures that a private key in the host client certificate is uncorrupted.

In box 322, information associated with a host client certificate is optionally analyzed to ensure that a partner certificate store trusts a certification authority associated with a host client certificate. For example, the management tool 150 ensures that the partner certificate store 126 trusts the first certification authority 112 that generated the host client certificate.

In box 324, a host client certificate message is optionally output to a user interface based on analyzing information associated with a host client certificate. For example, the management tool 150 outputs a host client certificate message to the user interface 152 based on analyzing information associated with the host client certificate. Then the method 300 continues to boxes 326-342, which are depicted in FIG. 4.

Figure 4:
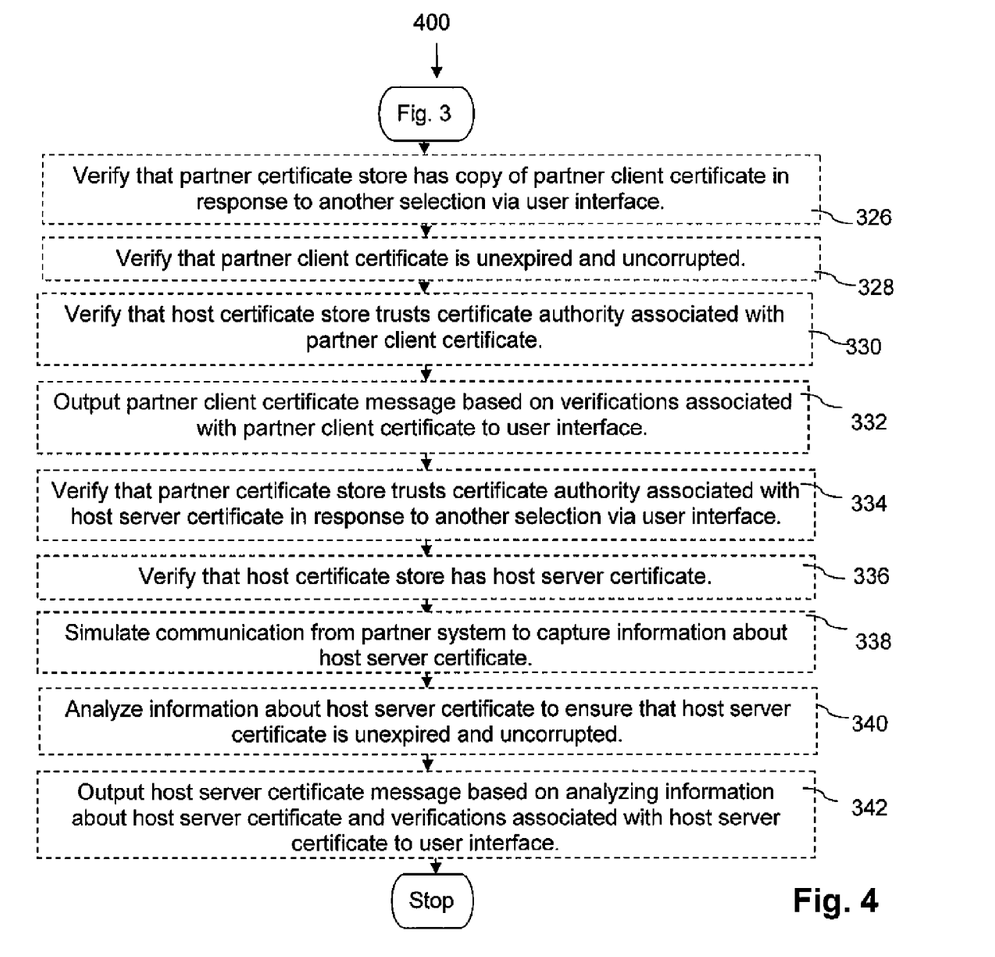
FIG. 4 shows a flowchart of yet another method for managing digital certificates according to some embodiments of the present disclosure.

FIG. 4 shows a flowchart of a method 400 for managing digital certificates according to some embodiments of the present disclosure. The system 100 can execute the method 400, as a continuation of method 300, to output messages based on analysis of information associated with host server certificates and partner client certificates.

In box 326, in response to another selection via a user interface, a partner certificate store is optionally verified to have a copy of a partner client certificate. For example, the management tool 150 verifies that the partner certificate store 126 has a copy of a partner client certificate.

In box 328, that a partner client certificate is unexpired and uncorrupted is optionally verified. For example, the management tool 150 compares the partner client certificate to a certificate revocation list.

In box 330, that a host certificate store trusts a certification authority associated with a partner client certificate is optionally verified. For example, the management tool 150 verifies that the first host certificate store 120 trusts the first certification authority 112 that generated the partner client certificate.

In box 332, a partner client certificate message is optionally output to a user interface based on verifications associated with a partner client certificate. For example, the management tool 150 outputs a partner client certificate message to the user interface 152 based on verifications associated with the partner client certificate.

In box 334, in response to another selection via a user interface, that a partner certificate store trusts a certification authority associated with a host server certificate is optionally verified. For example, the management tool 150 verifies that the partner certificate store 126 trusts the first certification authority 112 that generated the host server certificate.

In box 336, that a host certificate store has a host server certificate is optionally verified. For example, the management tool 150 verifies that the first host certificate store 120 includes the host server certificate.

In box 338, communication from a partner system is optionally simulated to capture information about a host server certificate. For example, the management tool 150 simulates communication from the first partner system 106 to capture information about the host server certificate.

In box 340, information about a host server certificate is optionally analyzed to ensure that a host server certificate is unexpired and uncorrupted. For example, the management tool 150 compares the host server certificate to a certificate revocation list.

In box 342, a host server certificate message is optionally output to a user interface based on analyzing information about a host server certificate and verifications associated with the host server certificate. For example, the management tool 150 outputs a host server certificate message to the user interface 152 based on analyzing information about a host server certificate and verifications associated with the host server certificate.

Some aspects of the system described above may be implemented on a computer with sufficient processing power, memory resources, and network throughput capability to handle the necessary workload placed upon it. FIG. 5 illustrates a typical computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 592 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for managing digital certificates, comprising:
a host system of a telecommunications provider comprising:
 a processor;
 a memory;
 a user interface;
 a plurality of disparate host certificate stores comprising a plurality of host server certificates; and
 a management tool comprising instructions stored on the memory that when executed by the processor:

retrieves a copy of one of the plurality of host server certificates from any of the plurality of disparate host certificate stores, provides the copy of the one of the plurality of host server certificates to a vendor's partner system for loading in a partner certificate store, communicates with the partner system to validate the one of the plurality of host server certificates, validates the copy of the one of the plurality of host server certificates loaded in the partner certificate store, outputs a host server certificate message based on the validation to the user interface, communicates with the vendor's partner system to validate a host client certificate, a partner server certificate, and a partner client certificate, wherein the plurality of host server certificates, the host client certificate, the partner server certificate, and the partner client certificate allow the host system to access applications of the vendor's partner system and the vendor's partner system to access applications of the host system, retrieves a copy of the partner server certificate from the partner system, loads the copy of the partner server certificate to any of the plurality of disparate host certificate stores, communicates with the partner system to validate the copy of the partner server certificate, and outputs a partner server certificate message to the user interface.

2. The system of claim 1 wherein the management tool generates a certificate signing request, forwards the certificate signing request to the vendor's partner system, receives the host client certificate from the vendor's partner system, verifies the host client certificate is valid, provides a copy of the host client certificate to any of the plurality of disparate host certificate stores, translates the host client certificate for use by host applications, uploads the host client certificate to the host applications in a proper format, communicates with the vendor's partner system to validate the host client certificate, and outputs a host client certificate message to the user interface.

3. The system of claim 1 wherein the management tool prompts the vendor's partner system for a certificate signing request, forwards the certificate signing request to a certification authority, receives the partner client certificate from the certification authority, provides a copy of the partner client certificate to any of the plurality of disparate host certificate stores, and forwards the partner client certificate to the vendor's partner system for loading in the partner certificate store.

4. The system of claim 3 wherein the management tool requests communication from the vendor's partner system to the management tool using the copy of the partner client certificate validates the partner client certificate, and outputs a partner client certificate message to the user interface.

5. The system of claim 3 wherein the management tool simulates communication from the vendor's partner system using the copy of the partner client certificate to validate the partner client certificate, and outputs a partner client certificate message to the user interface.

6. The system of claim 5 wherein the management tool uses a test message to at least one of communicate with the vendor's partner system and simulate communication from the vendor's partner system.

7. The system of claim 1 wherein the host system is at least one of a test environment prior to testing an application, a production environment executing the management tool on a periodic basis, and a production environment executing the management tool in response to a request to identify a source of a problem.

8. The system of claim 1 wherein the management tool ensures each of the plurality of disparate host certificate stores exists, opens each of the plurality of disparate host certificate stores, ensures each certificate store password in the plurality of disparate host certificate stores is valid, ensures each of the plurality of disparate host certificate stores is properly formatted, and reports any expired entries to the user interface.

9. The system of claim 1 wherein the management tool validates public key/private key pairs used for client identity during secure sockets layer communications to validate a global certificate store.

10. The system of claim 1 wherein the management tool validates trusted certificate entries used for server certificate trust validation during secure sockets layer communications to validate a global trust store.

11. A computer implemented method for managing digital certificates, comprising:

retrieving, by a host system of a telecommunications provider comprising a processor, a copy of one of a plurality of host server certificates from any of a plurality of disparate host certificate stores;

providing, by the host system, the copy of the one of the plurality of host server certificates to a vendor's partner system for loading in a partner certificate store;

communicating, by the host system, with the vendor's partner system to validate the one of the plurality of host server certificates loaded in the partner certificate store;

validating, by the host system, the one of the plurality of host server certificates loaded in the partner certificate store;

outputting, by the host system, a host server certificate message based on the validation to a user interface;

communicating, by the host system, with the vendor's partner system to validate a host client certificate, a partner server certificate, and a partner client certificate, wherein the plurality of host server certificates, the host client certificate, the partner server certificate, and the partner client certificate allow the host system to access applications on the vendor's partner system and the vendor's partner system to access applications on the host system;

retrieving, by the host system, a copy of the partner server certificate from the partner system;

loading, by the host system, the copy of the partner server certificate to any of the plurality of disparate host certificate stores;

communicating, by the host system, with the partner system to validate the cony of the partner server certificate; and outputting, by the host system, a partner server certificate message to the user interface.

12. The computer implemented method of claim 11, further comprising:

Identifying, by the host system, an expiration date for a certificate in one of the plurality of disparate host certificate stores; and outputting, by the host system, an expiration notice to a user interface when the expiration date for the certificate is within a specified date range.

13. The computer implemented method of claim 12, further comprising:

creating, by the host system, a new certificate store based on the one of the plurality of disparate host certificate stores in response to a selection via the user interface;

generating, by the host system, a certificate signing request;

forwarding, by the host system, the certificate signing request to a certification authority;

receiving, by the host system, a new certificate that corresponds to the certificate from the certification authority;

loading, by the host system, the new certificate in the new certificate store;

providing, by the host system, the new certificate to the vendor's partner system;

receiving, by the host system, a notification associated with the new certificate from the vendor's partner system; and overwriting, by the host system, the new certificate store on the one of the plurality of disparate host certificate stores.

14. The computer implemented method of claim 13, wherein creating a new certificate store based on the one of the plurality of disparate host certificate stores comprises copying a subject name, an encryption algorithm, an email attribute, and a distribution list from the one of the plurality of disparate host certificate stores to the new certificate store.

* * * * *